(12) United States Patent
Mayer et al.

(10) Patent No.: US 7,730,980 B2
(45) Date of Patent: Jun. 8, 2010

(54) STEERING DEVICE FOR FLOOR CLEANING MACHINE

(75) Inventors: Heinrich-Tito Mayer, Jonschwil (CH); Franz Oberhaensli, Mosnang (CH); Beat Staeger, Waengi (CH)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 12/161,910

(22) PCT Filed: Jan. 25, 2007

(86) PCT No.: PCT/US2007/061042
§ 371 (c)(1),
(2), (4) Date: Jul. 23, 2008

(87) PCT Pub. No.: WO2007/087597
PCT Pub. Date: Aug. 2, 2007

(65) Prior Publication Data
US 2009/0020356 A1  Jan. 22, 2009

Related U.S. Application Data

(60) Provisional application No. 60/761,948, filed on Jan. 25, 2006.

(51) Int. Cl.
*B62D 51/04* (2006.01)
(52) U.S. Cl. .................... 180/19.1; 180/6.48; 180/19.3
(58) Field of Classification Search ................ 180/6.48, 180/19.3, 19.2, 19.1, 186.5, 186.48
See application file for complete search history.

(56) References Cited

U.S. PATENT DOCUMENTS

| | | | |
|---|---|---|---|
| 5,044,043 A * | 9/1991 | Basham et al. ................. 15/319 |
| 5,622,236 A | 4/1997 | Azumi et al. |
| 7,017,689 B2 * | 3/2006 | Gilliland et al. ............ 180/19.1 |
| 7,043,794 B2 * | 5/2006 | Conner et al. .............. 15/340.2 |
| 7,062,816 B2 * | 6/2006 | Kasper et al. .............. 15/340.2 |
| 2005/0247508 A1 * | 11/2005 | Gilliland et al. ............. 180/402 |
| 2009/0014219 A1 * | 1/2009 | Springston et al. .......... 180/19.1 |

FOREIGN PATENT DOCUMENTS

| EP | 0404437 | 12/1990 |
|---|---|---|
| EP | 1319577 | 6/2003 |
| EP | 1350706 | 10/2003 |

OTHER PUBLICATIONS

International Search Report from the European Patent Office.

* cited by examiner

*Primary Examiner*—Kevin Hurley
*Assistant Examiner*—Tashiana Adams
(74) *Attorney, Agent, or Firm*—Gregory S. Bollis

(57) ABSTRACT

A floor cleaning machine having a speed control and steering member which operates under operator-applied deformation thereof. The invention provides improved consumer convenience at steering and/or speed control.

14 Claims, 5 Drawing Sheets

STEERING DEVICE FOR FLOOR CLEANING MACHINE

BACKGROUND OF THE INVENTION

The present invention relates to floor cleaning machines and in particular to automatic floor cleaning and treating machines which are used for the cleaning of carpets and hard surfaces of large floor areas, such as in hotels, factories, office buildings, shopping centers and the like.

In general such machines comprise a movable body carrying a brushing means, reservoirs for storing fresh and spent cleaning liquid, means for dosing fresh cleaning liquid onto the floor and a squeegee/vacuum pick-up system for recovering spent cleaning liquid from the floor.

These machines are normally power-operated comprising a pair of driving wheels for moving the body, a motor for driving the wheels, and steering and speed control members for operating the driving motor. Steering may either be manual or by way of differentiated control of the individual wheel speeds.

The present invention now in particular relates to a means for controlling speed and/or steering of a floor cleaning machine.

SUMMARY OF THE INVENTION

According to some embodiments of the invention there is provided a floor cleaning machine comprising a body, a pair of driving wheels for moving the body, an electric motor is coupled to each driving wheel, and a steering assembly for controlling the operation of the driving motors and the direction of motion of the floor cleaning machine. The steering assembly includes a member that is deformable under operator-applied force and also comprises a component which is capable of controlling the current provided to each driving motor as a function of operator-applied deformation of the member.

One particular embodiment of the present invention is directed toward a steering assembly for a floor cleaning machine having a pair of drive wheels powered by independent motors. The steering assembly includes an elongated frame member and a hand manipulable pivotal member coupled to the frame member. The hand manipulable pivotal member is pivotable about an axis normal to the elongated frame member. A spring extends between the frame member and the hand manipulable pivot member. The spring is positioned and configured to exert a force on the frame member in response to pivotal movement of the hand manipulable pivotal member. A sensor is coupled to the elongated frame member to detect deformation of the frame member due to exerted forces by the spring. A control is coupled to the sensor and the motors of the drive wheels of the cleaning machine. The control receives signals from the sensor and selectively powers each drive wheel motor in response to the signals from the sensor.

Another embodiment is directed toward a steering assembly for a floor cleaning machine having a pair of drive wheels powered by independent motors. The steering assembly comprises a frame member and a handle bar coupled to the frame member and positioned substantially normal to the frame member. The handle bar has cantilevered ends relative to the frame member, wherein an applied force to the cantilevered ends of the handle bar cause the frame member to deform. A sensor is coupled to the frame member to detect deformation of the frame member due to exerted force on the cantilevered ends of the handle bar. A controller is coupled to the sensor and the motors of the drive wheels of the cleaning machine. The controller receives signals from the sensor and selectively powers each drive wheel motor in response to the signals from the sensor.

Another embodiment is directed toward a steering and speed control assembly of a floor cleaning machine. The steering and speed control assembly comprises a frame member having a hand manipulable speed control device and a hand manipulable pivotal steering control member coupled to the frame member. The hand manipulable pivotal steering control member is pivotable about an axis normal to the frame member. A spring extends between the frame member and the hand manipulable pivotal steering control member. The spring is positioned and configured to exert a force on the frame member in response to pivotal movement of the hand manipulable pivotal steering control member. A sensor is coupled to the frame member to detect deformation of the frame member due to exerted forces by the spring. A controller is coupled to the sensor, the hand manipulable speed control device, and the motors of the drive wheels of the cleaning machine. The controller receives signals from the sensor and selectively powers each drive wheel motor in response to the signals from the sensor. The controller also receives signals from the hand manipulable speed control device and powers both drive wheel motors in response to the signals from the hand manipulable speed control device. In some embodiments, the speed control device is directly coupled to the hand manipulable pivotal steering control member.

Another embodiment is directed toward a steering and speed control assembly of a floor cleaning machine. The steering and speed control assembly comprises a frame member having a hand manipulable speed control device and a handle bar steering control member coupled to the frame member. The handle bar has cantilevered ends relative to the frame member, wherein an applied force to the cantilevered ends of the handle bar cause the frame member to deform. A sensor is coupled to the frame member to detect deformation of the frame member due to exerted force on the cantilevered ends of the handle bar. A controller is coupled to the sensor and the motors of the drive wheels of the cleaning machine. The controller receives signals from the sensor and selectively powers each drive wheel motor in response to the signals from the sensor. The controller also receives signals from the hand manipulable speed control device and powers both drive wheel motors in response to the signals from the hand manipulable speed control device. In some embodiments, the speed control device is directly coupled to the handle bar steering control member.

Further aspects of the present invention, together with the organization and operation thereof, will become apparent from the following detailed description of the invention when taken in conjunction with the accompanying drawings.

DETAILED DESCRIPTION

Figure 1:
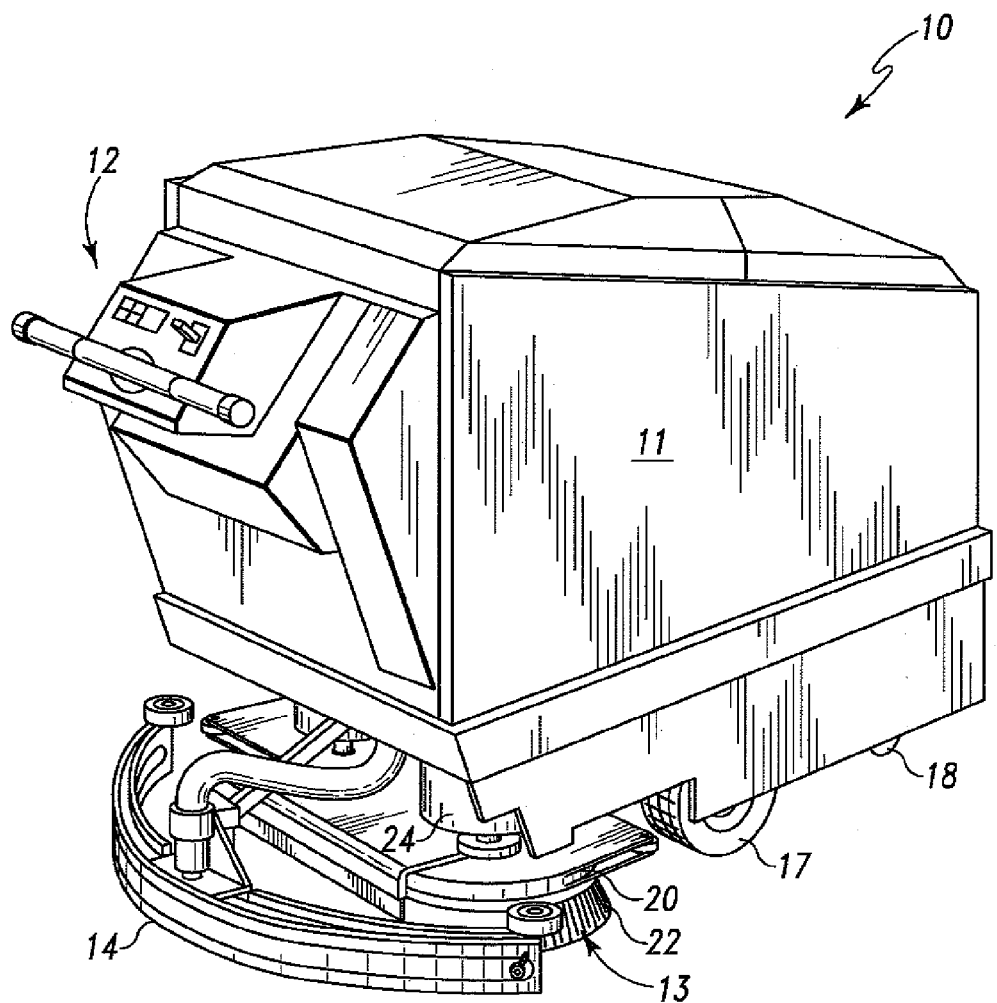
FIG. 1 is a perspective view of a floor cleaning machine with a steering assembly embodying aspects of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Finally, as described in subsequent paragraphs, the specific mechanical configurations illustrated in the drawings are intended to exemplify embodiments of the invention. Accordingly, other alternative mechanical configurations are possible, and fall within the spirit and scope of the present invention.

Referring now to FIG. 1, a floor cleaning machine 10 is shown, comprising a housing 11, an operator control assembly 12, a scrubbing assembly 13 and a squeegee 14. The cleaning machine 10 is supported on main drive wheels 16, 17 and one or more caster wheels 18. Although it is not illustrated, several items such as a tank, batteries, pumps, motors, and other parts can be housed within the housing 11.

Although the invention will be described in connection with a scrubber, it should be clear that the control has application to other types of vehicles that are controlled by an operator walking or riding behind the machine and are propelled by two electric motors, such as battery powered sweepers and the like. Accordingly, the present invention should not be limited to a scrubber.

As shown in FIG. 1, an operator control assembly 12 which is positioned toward the rear of the machine and used by the operator to control speed and direction. The operator control assembly includes a steering assembly 20 and speed control lever 22. Accordingly, speed and direction can be controlled independently with this operator control assembly 12. Although the speed control lever 22 is not directly coupled to the steering assembly 20, in some embodiments, the speed control device 22 can be directly coupled to or integrated into the steering assembly 20. For example, in some embodiments, the speed control device 20 can be integrated into or manipulated by a rotatable hand grip. Under such an alternative configuration, the speed control device 22 can still remain independently controlled.

Figure 2:
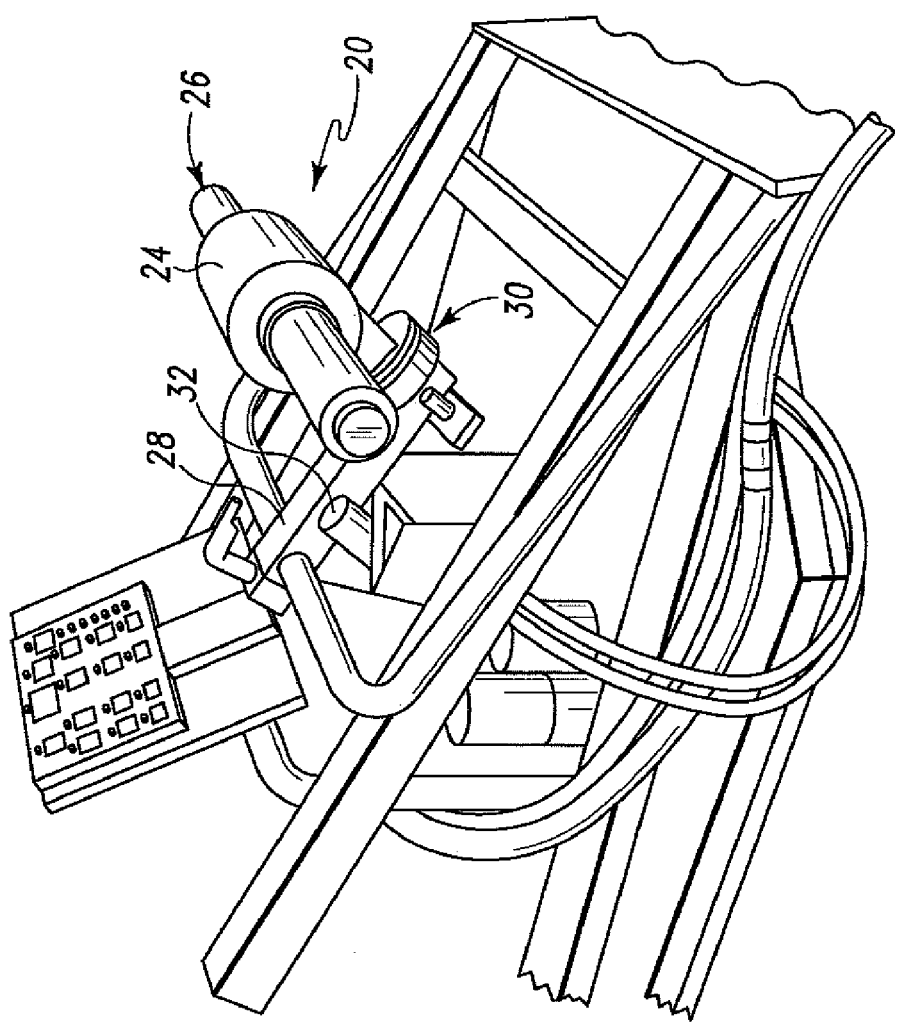
FIG. 2 is a perspective view of a steering assembly embodying aspects of the present invention.
Figure 3:
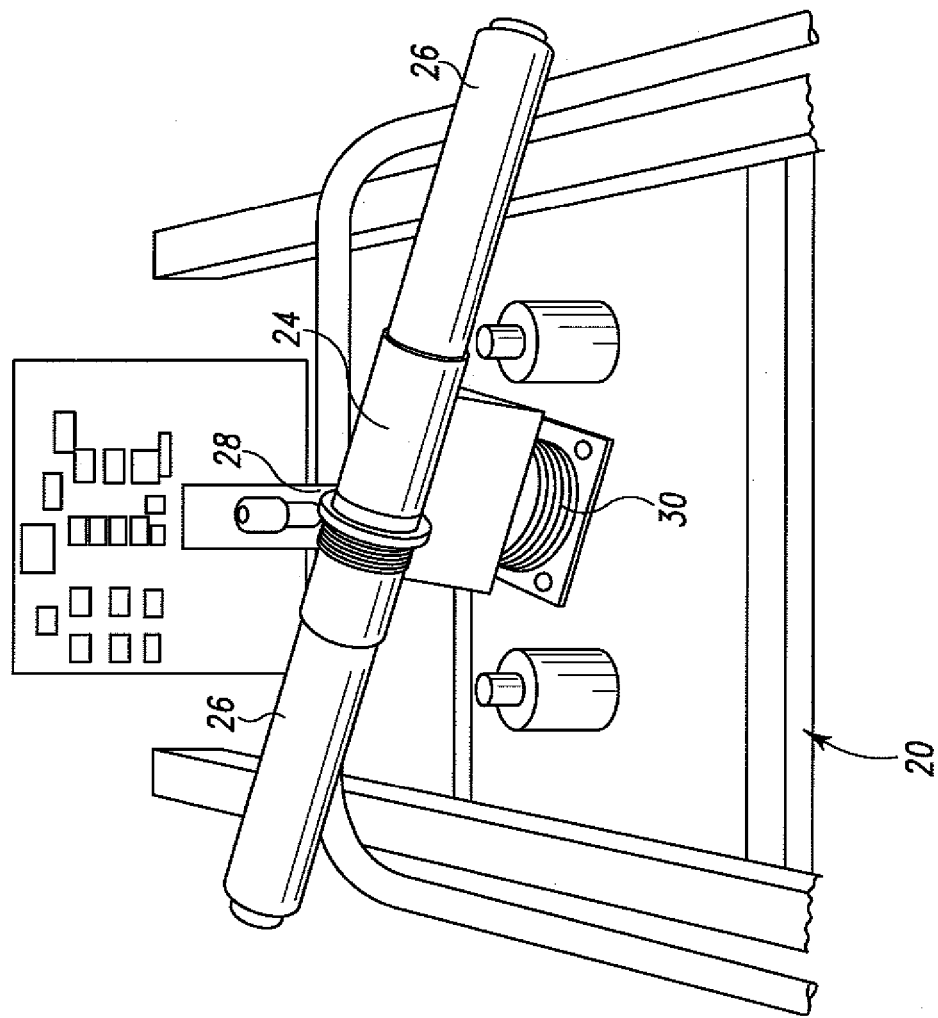
FIG. 3 is another perspective view of the steering assembly shown in FIG. 2, with the steering device rotated relative to FIG. 2.
Figure 4:
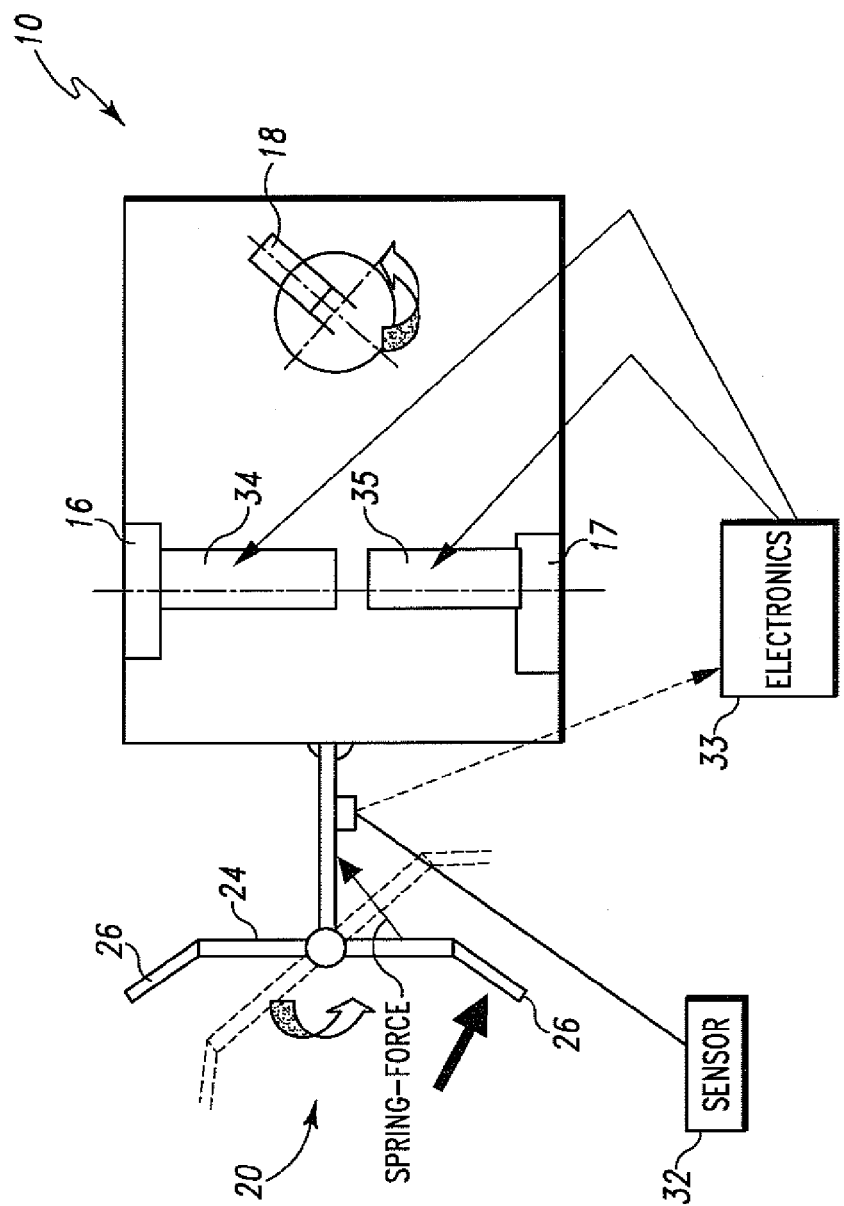
FIG. 4 is a schematic view of the steering assembly illustrated in FIG. 2, shown in relation to the sensor, controller, and drive wheel motors.

As shown in FIGS. 2 and 3 and schematically illustrated in FIG. 4, the steering assembly 20 includes a handle bar 24 (which in the illustrated embodiment of FIGS. 2 and 3 is pivotable) having hand grips 26. The handle bar 24 is pivotally coupled to and supported on a bar or frame member 28. As illustrated, the handle bar 24 is positioned on the frame member 28 to rotate about an axis that is substantially normal to the frame member 28.

A spring 30 extends between the handle bar 24 and the frame member 28. The spring can be a torsion spring, or more specifically, a dual throw coil spring. However, in other embodiments, other types of bias elements can be used. The spring 30 biases the handle bar 24 to a neutral position, such as the position illustrated in FIG. 2. The spring 30 generates a force on the frame member 28 in response to the handle bar 24 being rotated from the neutral position, such as shown in FIG. 4. This force causes deformation or bending of the frame member 28. As described below, this deformation is measured and used to steer the floor cleaning machine 10.

Figure 5:
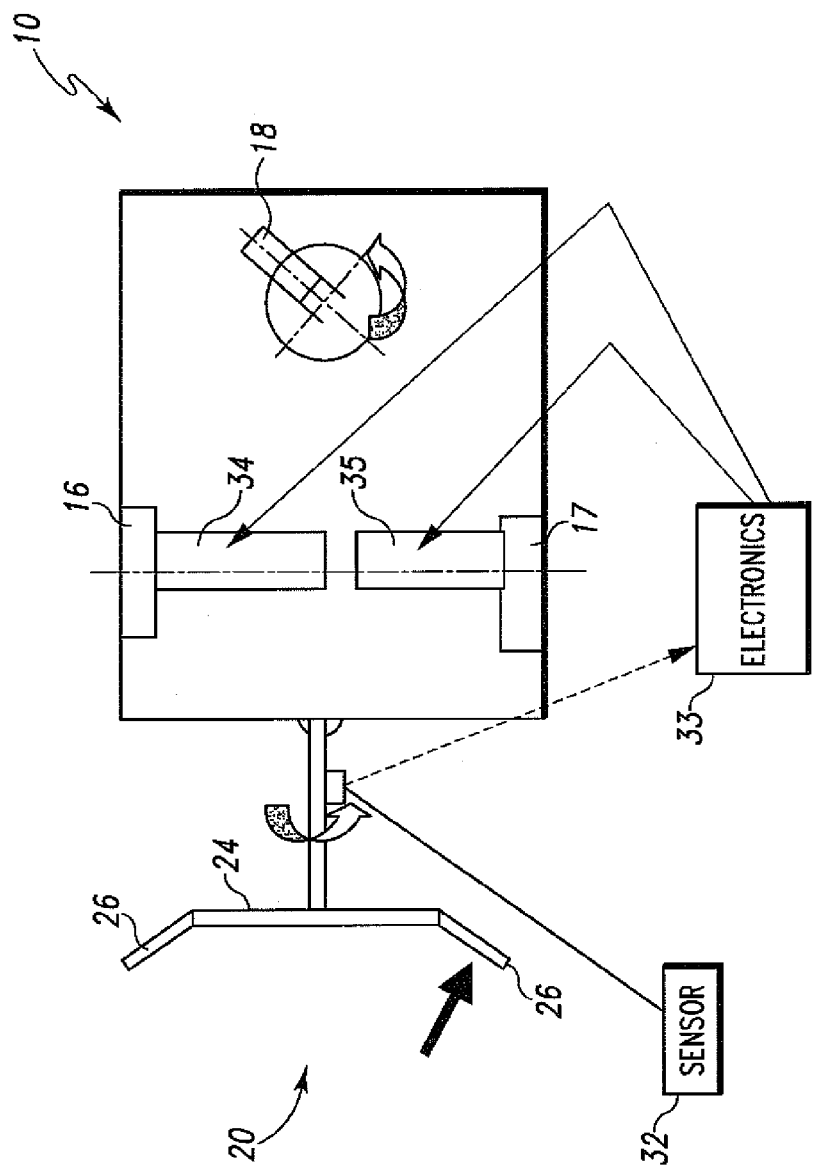
FIG. 5 is a schematic view of an alternative steering assembly embodying aspects of the present invention.

An alternative embodiment of the steering assembly 20 is shown schematically in FIG. 5. Unlike the embodiment shown in FIG. 4, the handle bar 24 of this embodiment is rigidly fixed to the frame member 28. In other words, the handle bar 24 does not pivot with respect to the frame member 28. Accordingly, any attempt to steer the floor cleaning machine 10 via the handle bar 24 will directly cause the frame member to bend or deform. Like the previous embodiment, this deformation is then measured and used to steer the floor cleaning machine.

In both embodiments, a sensor 32 is coupled to the frame member 28 to measure the deformation of the frame member 28. Many different sensors can be used to measure the deflection, deformation, or amount of bending in the frame member 28. For example, strain gauges, a Hall-effect sensors, and other deformation sensitive components can be used to measure the deformation. This measurement can then be used to cause the floor cleaning machine to turn a desired amount as described below.

As schematically illustrated in FIGS. 4 and 5, a separate drive motor 34, 35 is coupled to each drive wheel 16, 17. As such, each wheel can be driven independently to cause the floor cleaning machine 10 to turn. The drive motors 34, 35 are controlled in part by the sensor 32. In general, the deformation-sensitive component or sensor 32 does not necessarily directly control the current of the driving motors, but preferably is coupled to a controller, amplifying circuit, or other components 33 that control the motor current or power based at least partially upon the information received from the sensor 32.

In operation, the floor cleaning machine 10 can be placed in motion by manipulating the speed control lever 22. The direction can be independently controlled via the steering assembly 20. As illustrated in embodiment shown in FIG. 4, the handle bar 24 can be pivoted with respect to the frame member 28 by applying a force to the hand grips 26. By pivoting the handle bar 24, the spring 30 places a force on the frame member 28, causing the frame member 28 to deform or bend. The sensor 32 measures the deformation of the frame member 28 and relays the measurement to a controller 33, which then controls the power provided to each drive motor 34, 35. For example, in the illustrated embodiment of FIG. 4, the steering assembly is rotated to cause a left turn. As such, the power to the left motor 34 may be decreased, while the power to the right motor 35 remains the same or is increased.

Once the handle bar 24 of FIG. 4 is released, the spring 30 returns the handle bar 24 to the neutral position. As such, the bending or deforming force is removed from the frame member 28 and the frame member 28 elastically returns to a non-deformed configuration. Accordingly, no deflection will be detected by the sensor and equal power will be provided to each drive wheel motor 34, 35.

The operation of the embodiment shown in FIG. 5 is similar to the operation of the embodiment shown in FIG. 4, except the handle bar 24 assembly does not pivot with respect to the frame member. Rather, a force applied to the handle bar 24 directly causes deformation of the frame member 28. The sensor 32 measures the deformation of the frame member 28 and relays the measurement to a controller 33, which then controls the power provided to each drive motor 34, 35.

Once the force applied to handle bar 24 of FIG. 5 is released, the elastic force of the frame member 28 causes the frame member 28 to elastically return to a non-deformed configuration. Accordingly, no deflection will be detected by the sensor and equal power will be provided to each drive wheel motor 34, 35.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A floor cleaning machine comprising:
   first and second independent motors;
   first and second drive wheels powered by a respective one of the first and second independent motors; and
   a steering assembly comprising:
      an elongated frame member;
      a handle bar coupled to the frame member and pivotable about an axis normal to the elongated frame member;
      a spring extending between the frame member and the handle bar, the spring positioned and configured to exert a force on the frame member in response to pivotal movement of the handle bar,
      a sensor coupled to the elongated frame member to measure strain of the frame member due to exerted forces by the spring; and
      a controller coupled to the sensor and the first and second independent motors of the drive wheels of the cleaning machine, the controller receives signals from the sensor and selectively powers each drive wheel motor to propel the floor cleaning machine across a surface in response to the signals from the sensor, wherein the first and second motors are drivable at different speeds with respect to one another in response to the sensor sensing user actuation of the handle bar.

2. A floor cleaning machine comprising:
   first and second independent motors;
   first and second drive wheels powered by a respective one of the first and second independent and;
   a steering assembly comprising:
      a frame member;
      a handle bar coupled to the frame member and positioned substantially normal to the frame member, the handle bar having cantilevered ends relative to the frame member, wherein an applied force to the cantilevered ends of the handle bar cause the frame member to deform,
      a sensor coupled to the frame member to measure strain of the frame member due to exerted force on the cantilevered ends of the handle bar; and
      a controller coupled to the sensor and the first and second independent motors of the drive wheels of the cleaning machine, the controller receives signals from the sensor and selectively powers each drive wheel motor to propel the floor cleaning machine across a surface in response to the signals from the sensor, wherein the first and second motors are drivable at different speeds with respect to one another in response to the sensor sensing user actuation of the handle bar.

3. A steering and speed control assembly of a floor cleaning machine, the steering and speed control assembly comprising:
   a frame member;
   a hand manipulable speed control device coupled to the frame member;
   a handle bar coupled to the frame member and pivotable about an axis normal to the frame member;
   a spring extending between the frame member and the handle bar, the spring positioned and configured to exert a force on the frame member in response to pivotal movement of the handle bar,
   a sensor coupled to the frame member to measure strain of the frame member due to exerted forces by the spring;
   first and second independent motors;
   first and second drive wheels drivingly coupled to a respective one of the first and second independent motors; and
   a controller coupled to the sensor, the hand manipulable speed control device, and the first and second motors of the drive wheels of the cleaning machine, the controller receives signals from the sensor and selectively powers each drive wheel motor in response to the signals from the sensor; the controller also receives signals from the hand manipulable speed control device and powers both drive wheel motors in response to the signals from the hand manipulable speed control device, wherein steering of the machine is accomplished by controlling a speed of the first wheel driven by the first motor with respect to the second wheel driven by the second motor.

4. The steering and speed control assembly of claim 3, wherein the hand manipulable speed control device is directly coupled to the handle bar.

5. A steering and speed control assembly of a floor cleaning machine, the steering and speed control assembly comprising:
   a frame member;
   a hand manipulable speed control device coupled to the frame member;
   a handle bar coupled to the frame member and positioned substantially normal to the frame member, the handle bar having cantilevered ends relative to the frame member, wherein an applied force to the cantilevered ends of the handle bar cause the frame member to deform,
   a sensor coupled to the frame member to measure strain of the frame member due to exerted force on the cantilevered ends of the handlebar;
   first and second independent motors;
   first and second drive wheels drivingly coupled to a respective one of the first and second independent motors; and
   a controller coupled to the sensor and the first and second motors of the drive wheels of the cleaning machine, the controller receives signals from the sensor and selectively powers each drive wheel motor in response to the signals from the sensor, the controller also receives signals from the hand manipulable speed control device and powers both drive wheel motors in response to the signals from the hand manipulable speed control device, wherein the motors are drivable at different speeds with respect to one another in response to the sensor sensing user actuation of the handle bar.

6. The steering and speed control assembly of claim 5, wherein the hand manipulable speed control device is directly coupled to the handle bar.

7. The floor cleaning machine of claim 1, wherein the drive wheels are powered solely by the respective motors.

8. The floor cleaning machine of claim 1, wherein the first and second motors operate at different speeds with respect to one another to turn the machine in response to the sensor sensing user actuation of the handle bar.

9. The floor cleaning machine of claim 2, wherein the drive wheels are powered solely by the respective motors.

10. The cleaning machine of claim 2, wherein the first and second motors operate at different speeds with respect to one another to turn the machine in response to the sensor sensing user actuation of the handle bar.

11. The steering assembly of claim 3, wherein the first and second motors are drivable at different speeds with respect to one another in response to the sensor sensing user actuation of the handle bar.

12. The steering assembly of claim 11, wherein the first and second motors operate at different speeds with respect to one another to turn the machine in response to the sensor sensing user actuation of the handle bar.

13. The steering assembly of claim 5, wherein the first and second motors operate at different speeds with respect to one another to turn the machine in response to the sensor sensing user actuation of the handle bar.

14. The steering assembly of claim 5, wherein steering of the machine is accomplished by controlling a speed of the first wheel driven by the first motor with respect to the second wheel driven by the second motor.

\* \* \* \* \*

UNITED STATES PATENT AND TRADEMARK OFFICE
CERTIFICATE OF CORRECTION

PATENT NO.        : 7,730,980 B2                                    Page 1 of 1
APPLICATION NO.   : 12/161910
DATED             : June 8, 2010
INVENTOR(S)       : Heinrich-Tito Mayer et al.

It is certified that error appears in the above-identified patent and that said Letters Patent is hereby corrected as shown below:

Column 7, line 14:
In Claim 10

--floor-- should be inserted after The

The floor cleaning machine of claim 2, wherein the first and second motors operate at different speeds with respect to one another to turn the machine in response to the sensor sensing user actuation of the handle bar.

Signed and Sealed this

Twenty-first Day of September, 2010

David J. Kappos
*Director of the United States Patent and Trademark Office*